3,560,997
Patented Feb. 2, 1971

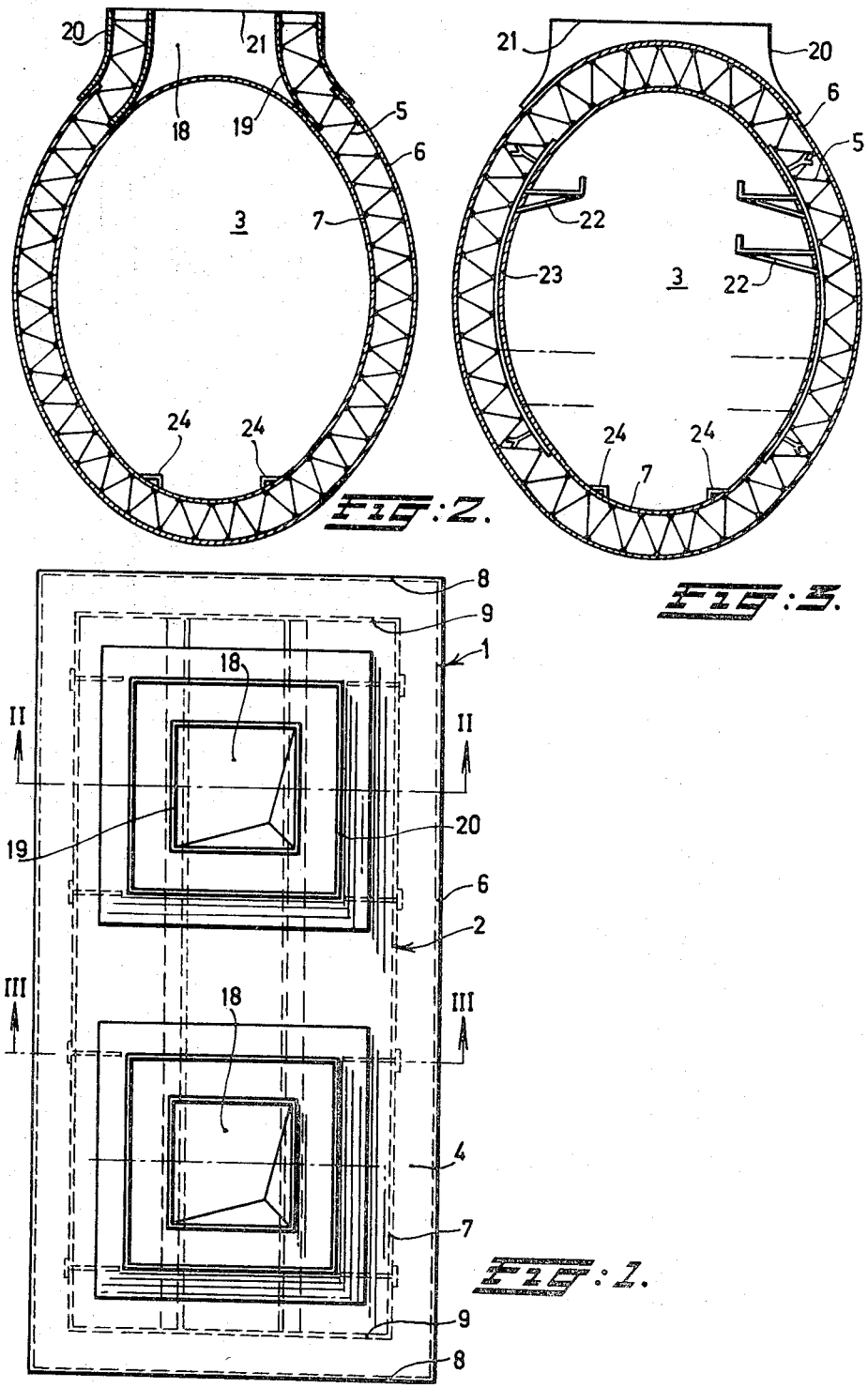

3,560,997
CABLE SHAFT
Helmut Goldschmidt, Schepsdorf, and Heinrich Baunemann, Munster, Westphalia, Germany, assignors to Industriele Onderneming Wavin N.V., Zwolle, Netherlands
Filed Mar. 5, 1969, Ser. No. 804,617
Claims priority, application Germany, Mar. 12, 1968, P 16 90 537.6
Int. Cl. E04h 5/06; H02g 9/10
U.S. Cl. 52—20                                   10 Claims

ABSTRACT OF THE DISCLOSURE

A cable shaft for accommodating branchings of a cable consisting of two concentric thin walled plastic bodies one being disposed in the other. The intermediate space between both bodies contains a reinforcement and a filling mass such as concrete or a foam plastic.

---

The invention relates to cable shafts for accommodating branchings of a cable and the like.

Known cable shafts consist of finished articles made of reinforced concrete which are assembled in situ. Also cable shafts are known which are assembled in situ as a brickwork construction. The walls of such cable shafts are not impermeable to liquids and gas. Cable shafts in the shape of brickwork constructions assembled in situ are furthermore, for economical reasons, only applied in special cases.

The cable shaft according to the invention comprises two concentric rather thin-walled, plastic made hollow bodies, one being disposed in the other, which constitute the walls of the shaft and enclose together therebetween an intermediate space in which is maintained a reinforcement means for stiffening the hollow bodies and fixing them in position with respect to one, the other, and a filling mass.

The cable shaft according to the invention is absolutely gas tight and waterproof, so that with this shaft in combination with cable channels consisting of plastic tubes it is possible to form cable channel installations which do not require any maintenance. The expression thin walled defines a thickness ranging from 2 to 10 mm., preferably 2 to 5 mm.

In order to facilitate the manufacture and reduce the cost of material and the cost of assemblage the hollow bodies consist each of pre-fabricated bodies which are connected e.g. by welding, so as to form an air tight and waterproof building unit. The hollow body consists efficiency of a main part constituting the body of the shaft and end pieces closing same. Preferably the main part is shaped as a shell with an oval or elliptic cross section, which when placed upright has a comparatively small basis and a large inner space and great resistance against pressure. The end pieces may constitute a flat or outwardly arched wall or also an outwardly tapering wall which merges into a flat central surface, and may have inlets and bushings for the cable in the shape of sealing sockets.

According to a further aspect of the invention the hollow bodies are recessed on their upper side in order to form an entrance and they have astraddle thereof boundary walls surrounding the openings and forming an extension of the intermediate space. In this way there is created besides the requires means for access for purposes of assemblage on laying the cable but also a very simple means for filling the intermediate space with a filling mass. As a filling mass preferably a mass is used which can be poured into the intermediate space and which hardens and sets respectively, so that after solidification it contributes to a stiffening of the skeleton of the wall. Very appropriate therefore is concrete which on the one hand is comparatively cheap and on the other hand sufficiently firm and heavy enough to absorb the upward forces acting upon the cable shaft.

The invention relates further to a method for manufacturing cable shafts. This method is characterized in that the hollow bodies are constructed in situ from sets of building elements, while subsequently the intermediate space is filled with a filling mass. Due to this method the components of the cable shaft can be conveyed in a compact shape to the location where the shaft is to be built, whereby the shortest transport routes may be chosen for the component, viz the filling mass, which as to weight requires the greatest efforts of conveyance.

Further features and advantages will appear from the description and claims with reference to the drawing in which some embodiments of the invention are represented.

In the drawing:

FIG. 1 represents diagrammatically a plan view of a first embodiment of a cable channel according to the invention;

FIG. 2 is a section taken along the line II—II in FIG. 1;

FIG. 3 is a section taken along the line III—III in FIG. 1;

The cable shaft consists of two concentric, comparatively thin-walled, plastic made hollow bodies 1 and 2, one of which being disposed in the other. The plastic is for instance reinforced polyester, e.g. polyester with glass fibre having a thickness of 3 mm.

The two hollow bodies 1, 2 enclose together an intermediate space 4 having a width of 5–10 cm. which practically fully surrounds the inner space 3 of the cable shaft; the distance between the hollow bodies may be equal at all locations of the wall. In order to ensure the degree of spacing of the hollow bodies 1, 2 a steel reinforcement 5 is provided in the annular intermediate space 4, which in the shape of a grid or a honeycomb or any other suitable configuration constitutes a stiffening skeleton which is no obstacle for a subsequent filling of the intermediate space with a filling mass (not shown).

With consideration of economy rigidity and weight concrete is preferably used as a filling mass which can be easily poured and which sets rapidly. It is, however alternatively possible to fill the intermediate space with sand or gravel, when rigidity is a secondary object. It is also possible to fill the intermediate space with a foam plastic if arrangements have been made to absorb the upward forces in the earth acting upon the cable shaft.

Figure 5:
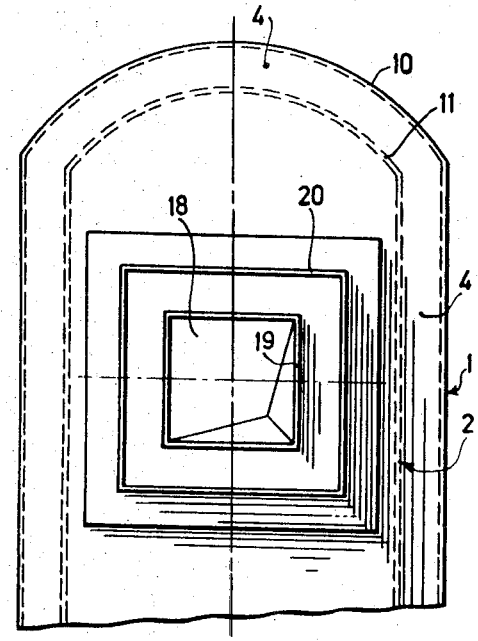
FIGS. 5, 6 and 7 represent fragmentary plan views of modified embodiments of the cable shaft according to the invention.
Figure 6:
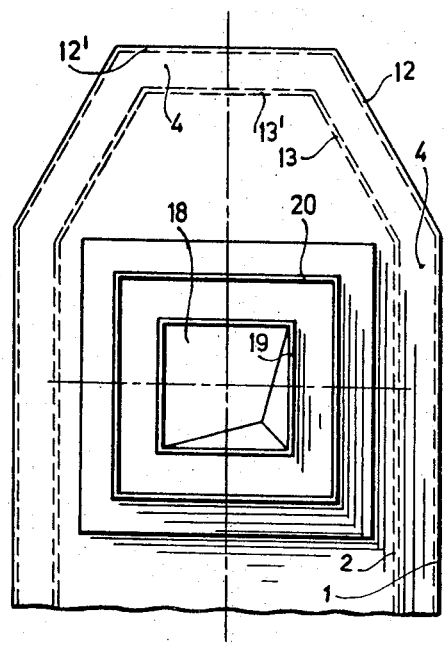
Figure 4:
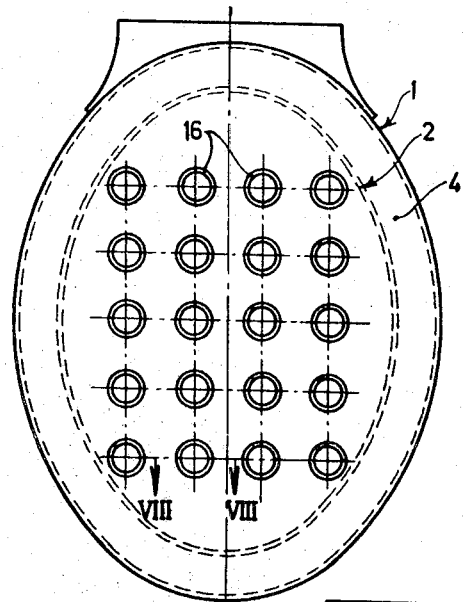
FIG. 4 is a front view of the cable shaft according to FIG. 1.
Figure 8:
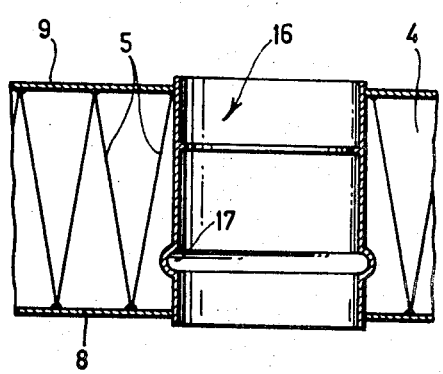
FIG. 8 is, to a larger scale, a part of a section according to the line VIII—VIII in FIG. 4.
Figure 7:
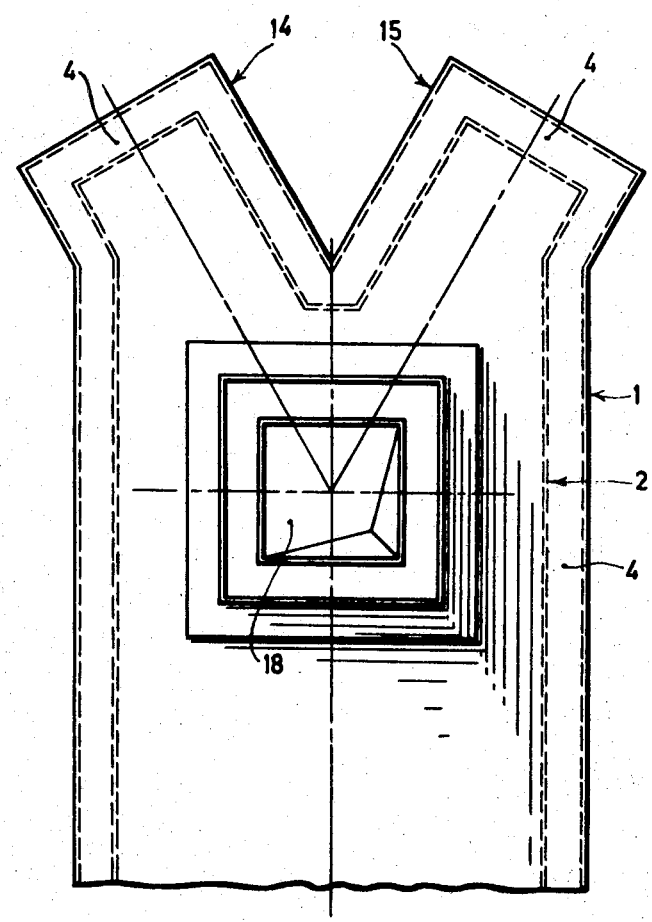

The hollow bodies 1, 2 consist each of prefabricated part-bodies, viz a main part 6, 7 respectively constituting the body of the shaft and end pieces 8, 9 respectively closing same. In the embodiment according to FIG. 1 the main parts consist of horizontal tubular pieces with an elliptic or oval cross section which may be easily manufactured conventionally. The end pieces 8, 9 are flat plates which are connected, especially by glueing, with the main parts 6, 7 respectively. Instead of the flat end pieces 8, 9, arcuate outwardly arched end pieces 10, 11 of the kind according to FIG. 5 and adapted to the cross sectional shape may be employed, or end pieces 12, 13 which according to FIG. 6 taper outwards and merge into a flat central face 12', 13'. Also end pieces may be employed which, according to FIG. 7, form a branching with connecting areas 14, 15 which are inclined at an angle one with the other. Inlets and bushings for the cable constructed as sealing sockets 16 are provided in the closing walls formed by the end piece, as is further shown in the FIGS. 4 and 8, in which the ends of the tubular cable channels can be sealingly inserted. A nut 17 extending on all sides may accommodate e.g. a joint ring.

The hollow bodies 1, 2 are recessed at their upper side so that an entrance 18 is formed around which extend plates or boundary walls 19, 20 disposed astraddle of main parts 7 and 6 respectively and forming an extension of the intermediate space 4 onto an upper flat closing surface 21. These entrances may be closed in an air tight and waterproof manner by means of a cover and the interposition of suitable seals. The intermediate space 4 upwardly extending between the boundary walls 19, 20, is in this way accessible from above via a slit surrounding the opening 18, whereby the filling mass can be poured into the intermediate space 4 via the slit. The walls 6, 7 of the tubes are provided with regularly spaced entrances 18, with boundary walls 19, 20, so that on the one hand the filling mass is capable of being distributed over the total intermediate space and on the other hand it becomes possible to manufacture practically the shells 6, 7 in great length and to subsequently separate the main parts for the cable shaft from the longer ribbons, the separated parts corresponding to the desired length.

Supports 22 for supporting the cables can be provided in the interior of the cable shaft, these supports with their means of attachment protruding through the inner shell 7 into the intermediate space 4 in which separate stiffenings 23 may be provided. In the lower area of the inner shell supports 24 may be disposed on which a grid serving as a gangway can be placed.

The prefabricated separate parts of the cable shaft which are efficiently united to building elements are conveyed to the location whereat the cable shaft should be built in. Contrary to the transport of the conventional kind of finished articles of reinforced concrete in this case only comparatively low weights are to be transported over longer distances.

The cable shafts are then built in situ by assembling the building elements and joining them sealingly, e.g. by welding, whereupon the cable shaft is introduced into its enclosure and subsequently the intermediate space is filled with the filling mass.

Instead of being constructed as a tubular shell with an elliptic cross section the hollow bodies may also consist of tubular shells with a cylindrical cross section or any other suitable combined shapes. It is also possible to provide reinforcements consisting of pieces obtained by injection molding. More cable shafts may be combined in order to obtain a compact cable shaft installation.

What we claim is:

1. A cable shaft for accommodating branches of a cable, said cable shaft comprising two concentrically arranged annularly spaced tubular thin-walled bodies constituting respectively an inner and an outer body, each of said bodies having opposite open ends and a substantially elliptical cross-section with a major and a minor diametral plane, said bodies being adapted for being supported substantially in a horizontal attitude with said major diametral plane extending vertically and said minor diametral plane extending horizontally, opposite end walls tightly sealing said opposite open ends of each of said bodies, reinforcement stiffening means connected to said bodies in the annular space between said bodies for fixing said bodies in position relative to one another, a filler mass supported in the annular space between said bodies, said bodies each including an upper portion, said outer body being provided with an opening in the upper portion thereof, and extension means for communicating said opening in said outer body with the annular space between said bodies, said extension means including a first pair of plates embracing the opening in the outer body and a second pair of plates embracing the upper portion of the inner body in spaced relation with said first pair of plates for cooperation therewith in communicating with the annular space between said bodies, said opposite end walls each including a plurality of sealing bushings for sealingly receiving a respective cable branch to be housed internally of the inner body.

2. A cable shaft as claimed in claim 1, wherein each of said elliptical, tubular bodies is plastic.

3. A cable shaft as claimed in claim 2 including a plurality of prefabricated, axially interconnected stages of said bodies.

4. A cable shaft as claimed in claim 2, wherein said opposite end walls are flat.

5. A cable shaft as claimed in claim 2, wherein said opposite end walls are arcuate.

6. A cable shaft as claimed in claim 2, wherein said opposite end walls include portions tapering outwardly into a flat central surface.

7. A cable shaft as claimed in claim 2, wherein said opposite end walls include a pair of branch portions, said branch portions being inclined relative to one another at a prescribed angle.

8. A cable shaft as claimed in claim 2, wherein said filler mass is adapted for being poured through said extension means into the annular space between said bodies to harden and set therein.

9. A cable shaft as claimed in claim 8, wherein said filler mass is a concrete mixture.

10. A cable shaft as claimed in claim 8, wherein said filler mass is a foamed plastic.

References Cited

UNITED STATES PATENTS

| | | | |
|---|---|---|---|
| 810,855 | 1/1906 | Haller et al. | 52—21X |
| 1,389,151 | 8/1921 | Misegadis | 52—20 |
| 1,712,510 | 5/1929 | Monie | 52—20X |
| 2,558,580 | 6/1951 | Pomykala | 52—20 |
| 3,221,881 | 12/1965 | Weiler et al. | 52—20X |
| 3,263,577 | 8/1966 | Hiller | 52—20X |
| 3,390,225 | 6/1968 | Couch et al. | 52—20X |

PRICE C. FAW, JR., Primary Examiner

U.S. Cl. X.R.

52—221; 174—37